(12) United States Patent
Yoshiura et al.

(10) Patent No.: US 6,879,978 B2
(45) Date of Patent: Apr. 12, 2005

(54) SYSTEM AND METHOD OF SEARCHING FOR ELECTRONIC DATA

(75) Inventors: Hiroshi Yoshiura, Tokyo (JP); Hirokazu Aoshima, Yokohama (JP); Eiichi Kamada, Funabashi (JP); Atsushi Kikuta, Kashiwa (JP)

(73) Assignee: Hitachi, Ltd., Tokyo (JP)

( * ) Notice: Subject to any disclaimer, the term of this patent is extended or adjusted under 35 U.S.C. 154(b) by 504 days.

(21) Appl. No.: 09/975,160

(22) Filed: Oct. 12, 2001

(65) Prior Publication Data

US 2002/0065819 A1 May 30, 2002

(30) Foreign Application Priority Data

Oct. 12, 2000 (JP) ........................................ 2000-312086

(51) Int. Cl.[7] ............................................. G06F 17/30
(52) U.S. Cl. ................................................ 707/3; 707/4
(58) Field of Search ........................ 707/9, 106, 104.1, 707/3, 4; 704/233; 705/14, 26, 28; 709/224; 380/28

(56) References Cited

U.S. PATENT DOCUMENTS

| | | | | |
|---|---|---|---|---|
| 5,905,800 A | * | 5/1999 | Moskowitz et al. | 380/28 |
| 6,094,649 A | * | 7/2000 | Bowen et al. | 707/3 |
| 6,286,001 B1 | * | 9/2001 | Walker et al. | 707/9 |
| 6,363,377 B1 | * | 3/2002 | Kravets et al. | 707/4 |
| 6,430,541 B1 | * | 8/2002 | Brown et al. | 705/28 |
| 6,578,078 B1 | * | 6/2003 | Smith et al. | 709/224 |
| 6,691,105 B1 | * | 2/2004 | Virdy | 707/3 |

FOREIGN PATENT DOCUMENTS

| | | |
|---|---|---|
| CN | 1144004 A | 5/1996 |
| EP | 0741360 A1 | 11/1996 |

* cited by examiner

*Primary Examiner*—Srirama Channavajjala
*Assistant Examiner*—Apu M Mofiz
(74) *Attorney, Agent, or Firm*—Antonelli, Terry, Stout & Kraus, LLP

(57) ABSTRACT

A search service provided by an electronic data search system including a search center and at least one authorization center. The search center receives a search request from an information browsing apparatus and in response searches for URLs that are associated with a search condition included in the search request in a search database that registers URLs of Web pages, associating those URLs with respective search conditions. The search center presents the information browsing apparatus with link information to the detected URLs. When the search request also includes a condition that authorization by the authorization center be given, then URLs that are registered in the search database associated with the search condition, and registered in the authorization center are searched. Link information of detected URLs is presented to the information browsing apparatus and the authorization center registers URLs of Web pages opened by information disclosing persons who have been given authorization.

3 Claims, 16 Drawing Sheets

FIG.5

SEARCH DATABASE 12

| URL | SEARCH CONDITION | CONTENT INFORMATION |
|---|---|---|
| http://www.*./ | * | *** |
| http://www.*.//... | * | *** |
| http://www.*.//.../.... | * | *** |
| http://www.*.//... | * | *** |
| ⋮ | ⋮ | ⋮ |

(51, 52, 53)

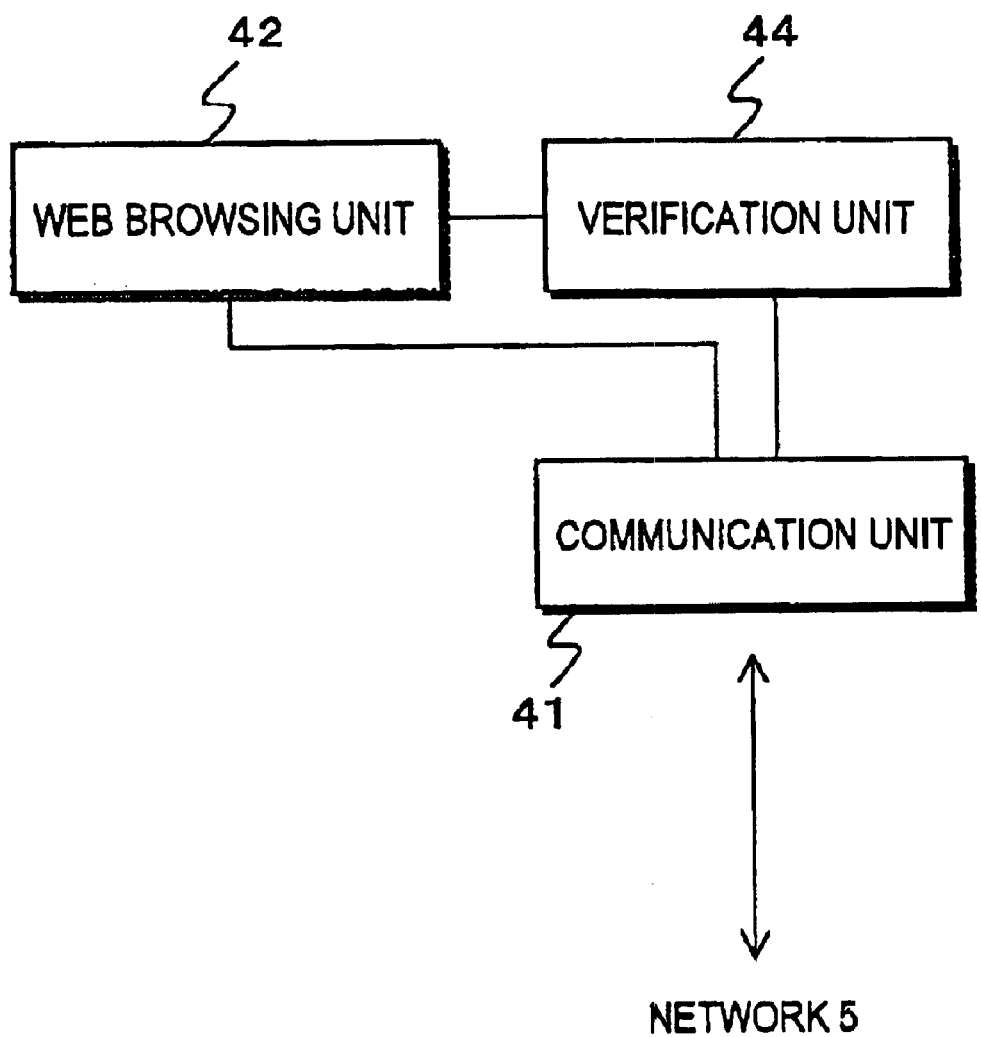

SYSTEM AND METHOD OF SEARCHING FOR ELECTRONIC DATA

This application claims a priority based on Japanese Patent Application No. 2000-312086 filed on Oct. 12, 2000, the entire contents of which are incorporated herein by reference for all purposes.

BACKGROUND OF THE INVENTION

The present invention relates to a technique of searching for an address of electronic data that satisfy a search request received from an information browsing person, and for presenting the information browsing person with information of the searched address or information to which a link to the electronic data at the searched address is set.

Conventionally, a searching service for finding a desired Web page among massive Web pages opened, on Internet, to the public, is provided. A means for realizing such a service is called a search engine, As search engines, directory-type (registration-type) search engines and robot-type search engines are known.

In either type of search engine, a URL (Uniform Resource Locator) of a Web page opened to the public by an Information disclosing person (an administrator of a Web server or a producer of the Web page) is registered in a search database, being associated with a search condition of the Web page in question. Then, input of a search condition is received using, for example, CGI (Common Gateway Interface), from an information browsing person (a user of a Web browser) who has accessed a search engine site on Internet. And, a URL of a Web page registered in the search database, being associated with a search condition that coincides with or approximates to the received search condition, is searched for, and the retrieved URL or information set with a link to the site of that URL is presented to the information browsing person.

Here, in the directory-type search engine, URLs of Web pages are classified by category to register in the search database, Namely, category is used as a search condition. Frequently, correspondence of a URL of a Web page to a category is decided based on designation by an information disclosing person who opens the Web page in question to the public.

On the other hand, in the robot-type search engine, a URL of a Web page is registered in the search database, associating the URL with keywords used in that Web page. Namely, keywords are used as a search condition. Processing of accessing each Web page opened to the public on the Internet, obtaining keywords used in the Web page in question, and registering those keywords in the search database, associating those keywords with the URL of that Web page, is automatically performed.

SUMMARY OF THE INVENTION

As Internet spreads rapidly in recent years, Importance of security problems on Internet, such as leakage of personal information, illegal acts in electronic commerce, etc., is increasing. The simplest solution not to encounter such a problem is to utilize only Web pages of which security (i.e., reliability of respective information disclosing persons who open the Web pages in question to the public) is guaranteed to some degree.

However, conventional search engines consider nothing of searching a Web page, taking a lesson from those problems.

In the case of a search engine (such as a directory-type search engine) of the type where a URL of a Web page is registered in a search database, associating the URL with a search condition specified by an information disclosing person who opens that Web page, it is possible to introduce only Web pages for which reliability of respective information disclosing persons is guaranteed to some degree to information browsing persons, by allowing registration in the following manner. Namely, before registration of a URL of a Web page in the search database, an information disclosing person who opens that Web page to the public is examined, and registration of the URL of his Web page in the search database is allowed only when he satisfies predetermined conditions. However, a search engine is required to register massive URLs of Web pages in its search database, for enriching its service. In the case of such a search engine, it entails a too excessive burden on the provider of the search engine service and is not realistic to examine an information disclosing person who opens a Web page for every URL of a candidate Web page for registration in the search database.

The present invention has been made considering the above situation. And, an object of the invention is to efficiently provide a search service that takes security into consideration.

To solve the above-described problems, the present invention provides:
at least one authorization center that registers addresses of electronic data opened to the public by information disclosing persons satisfying predetermined conditions required for ensuring security, in an authorization database; separately from
a search center that searches for addresses of electronic data satisfying a search condition (such as a category or keywords) included in a search request received from an information browsing person, and presents information having links to the detected addresses or the electronic data at the detected addresses, to the above-mentioned information browsing person.

When the search request received from a terminal of the information browsing person includes not only the search condition but also a condition that authorization by a certain authorization center is given, then, the above-mentioned search center searches for addresses of electronic data that satisfy the search condition and are registered in the authorization database of the authorization center, and the search center presents information having links to the electronic data at the detected addresses, to the terminal of the information browsing person.

Here, for example, Web data corresponds to electronic data, and in that case, a URL becomes an address of the electronic data.

According to the present invention, it is possible that only pieces of electronic data for which reliability of respective information disclosing persons is assured to some degree are introduced to an information browsing person, when the information browsing person sends the search center a search request that includes not only a search condition such as a category or keywords but also a condition that authorization by a desired authorization center is given. Further, the authorization center, which is provided independently of the search center, examines reliability of an information disclosing person and registers addresses of electronic data opened to the public by information disclosing persons whose reliability is assured, And, the search center does not need to examine, for example, reliability of a information disclosing person, when the address of the electronic data opened to the public by the information disclosing person is registered in the search database. Accordingly, an existing search engine such as a directory-type search engine or a robot-type search engine can be used as it is, for registering addresses of electronic data in the search database. Thus, the present invention can efficiently provide a search service that also takes security into consideration.

Further, in the present invention, it is preferable to provide authorization centers for respective kinds of security. Security, or reliability required for an information disclosing person, varies depending on purposes of electronic data opened to the public by that information disclosing person. For example, when the purpose is to provide news or information on the information disclosing person himself, then, it is sufficient to assure information browsing persons of security against leakage of personal information. However, when the purpose is to distribute contents such as music data or image data, then, it is also desired to assure information browsing persons of validity of the contents themselves (i.e., to assure that contents are not illegal copies). Further, when the purpose is to perform electronic commerce accompanied by money transfer with the information disclosing person, the, it is also desired to assure information browsing persons of security in settlement. Thus, reliability required for an information disclosing person is various, and accordingly, authorization conditions in examination by an authorization center also differ depending on degrees of the reliability required for the information disclosing person. Thus, examination becomes complex, if it is tried that one authorization center examines degrees of information disclosing persons who open electronic data for various purposes.

Thus, it is preferable to provide an authorization center for authorizing security against leakage of personal information, an authorization center for authorizing validity of contents provided by an information disclosing person, and an authorization center for authorizing security in electronic commerce, so that information disclosing person can select an authorization center to which he requests registration in an authorization database, according to the purpose of his electronic data opened to the public. Further, it is preferable that an information browsing person sends the search center a search request that requires authorization by an authorization center (or centers) suitable for the purpose of electronic data that he wishes to know. By this arrangement, it is possible to more efficiently provide a search service that also takes security into consideration.

BRIEF DESCRIPTION OF THE DRAWINGS

FIG. 5 is a diagram showing an example of contents of registration in a search database 12 shown in FIG. 4;

FIG. 16 is a diagram showing a variation of the information browsing apparatus 4 shown in FIG. 1.

DETAILED DESCRIPTION

In the following, one embodiment of the present invention will be described, taking an example of a case where electronic data is a Web page.

Figure 1:
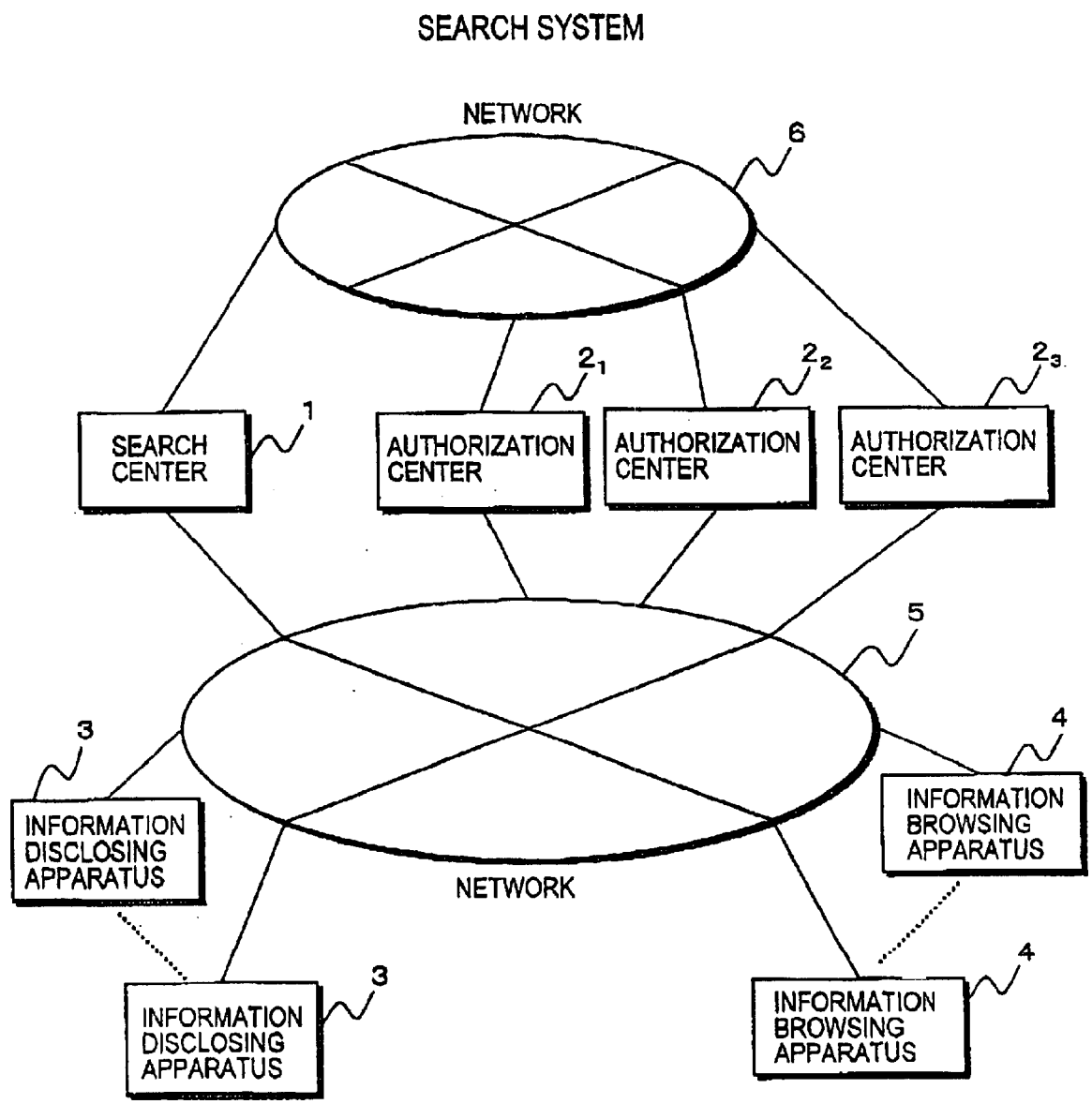
FIG. 1 is a schematic block diagram showing a search system to which a first embodiment of the present invention is applied.

FIG. 1 is a schematic block diagram showing a search system to which one embodiment of the present invention is applied.

As shown in the figure, the search system of the present embodiment comprises: a plurality of information disclosing apparatuses 3 that open respective Web pages to the public; a plurality of information browsing apparatuses 4 that browse the Web pages opened by the information disclosing apparatuses 3; a search center 1 that searches for a URL of a Web page satisfying a search request received from an information browsing person as an operator of an information browsing apparatus 4, and presents the information browsing apparatus 4 in question with information that has a link to the site of the searched URL; and authorization centers $2_1$–$2_3$ that manage URLs of Web pages opened to the public by information disclosing persons satisfying predetermined authorization conditions, through respective information disclosing apparatuses 3; the above-mentioned component apparatuses being connected with one anther through an open network 5 such as Internet. Further, the authorization centers $2_1$–$2_3$ and the search center 1 are connected to a dedicated network 6.

Here, in the present embodiment, the authorization centers are provided for respective degrees of reliability required for an information disclosing person. Namely, there are provided three authorization centers:

an authorization center A $2_1$ that manages URLs of Web pages opened by information disclosing persons who satisfy authorization conditions required for assuring security against leakage of personal information, an authorization center B $2_2$ that manages URLs of Web pages opened by information disclosing persons who satisfy authorization conditions required for assuring information browsing persons that contents such as music data, image data, or the like distributed to information browsing persons are valid contents (not illegal copies), and an authorization center C $2_3$ that manages URLs of Web pages opened by information disclosing persons who satisfy authorization conditions required for assuring security of settlement In electronic commerce for information browsing persons.

However, the present invention is not limited to this, and it is sufficient that at least one authorization center is provided.

Next, an outline of the search service provided by the search system shown in FIG. 1 will be described.

Figure 2:
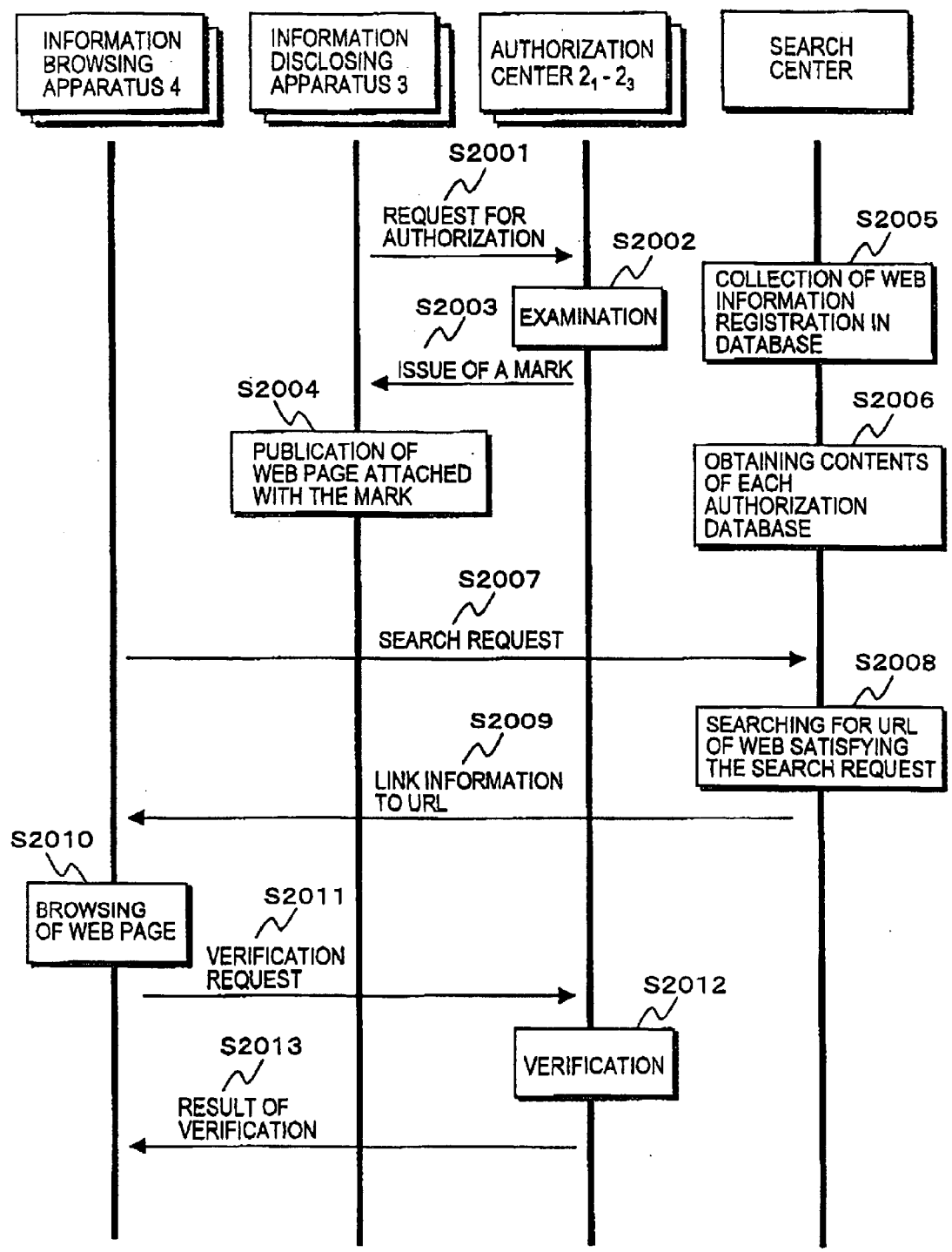
FIG. 2 is a diagram for explaining an outline of a search service provided by the search system shown In FIG. 1.

FIG. 2 is a diagram for explaining an outline of the search service provided by the search system of FIG. 1.

First, an information disclosing person requests the authorization centers $2_1$–$2_3$ to authorize that his Web page opened through an information disclosing apparatus 3 is reliable (S2001). This request may be made through the network 5 or by mail, for example.

For example, when the object of the Web page is to simply give news or information on the information disclosing person himself, the information disclosing person requests the authorization center A $2_1$ to authorize that the Web page's security is assured against leakage of personal information, When the object of the Web page is to distribute contents such as music data, image data, or the like, then, the information disclosing person requests the authorization center B $2_2$ to authorize that the contents distributed through the Web page are valid. Or, when the object of the Web page is to perform electronic commerce accompanied with money transfer, then, the information disclosing person requests the authorization center C $2_3$ to authorize that security of settlement in electronic commerce performed through the Web page is assured.

Receiving an authorization request from an information disclosing person, an administrator of the authorization center $2_1$–$2_3$ concerned examines if the Web page opened by the information disclosing person satisfies the predetermined conditions (S2002). As a result, when the predetermined conditions are satisfied, the administrator registers the URL of the Web page opened by the information disclosing person into the authorization database of the authorization center $2_1$–$2_3$ administered by himself, and issues an authorization mark (image data) that has a link to the authorization center $2_1$–$2_3$ administered by himself (S2003). This authorization mark may be sent from the authorization center $2_1$–$2_3$ to the information disclosing apparatus 3 of the information disclosing person, through the network 5, or may be sent by mail, being stored in a portable storage medium such as an FD. Then, the information disclosing person attaches the authorization mark on the Web page (having the authorization mark displayed together with the Web page), and opens it to the public through the information disclosing apparatus 3 (S2004), so as to impress information browsing persons with high reliability of his Web page, Here, the authorization conditions employed in examination can be decided by an administrator of an authorization center $2_1$–$2_3$ based on standards of the administrator himself, and depending on reliability of an information disclosing person, which is assured for information browsing persons.

Further, each administrator of the authorization centers $2_1$–$2_3$ periodically reexamines if a Web page specified by a URL or an information disclosing person of that Web page satisfies the predetermined authorization conditions, for each URL registered in the above-mentioned authorization database. And, a URL that does not satisfy the conditions now is deleted from the above-mentioned authorization database, and the deleted URL is registered in a cancelled-authorization database. Or, the term of validity is given to an authorization mark issued by an authorization center $2_1$–$2_3$ to an information disclosing person. And, with respect to an information disclosing person who has not requested reexamination within the term of validity or who proves not to satisfy the predetermined conditions as a result of reexamination, a URL of the Web page opened by him is deleted from the above-mentioned authorization database, and registered in the cancelled-authorization database. In that case, it is appropriate to issue an authorization mark again to an information disclosing person who has passed reexamination.

On the other hand, using an existing search engine such as a directory-type search engine or robot-type search engine, the search center 1 collects information on respective Web pages opened by information disclosing apparatuses 3, and registers the collected pieces of information into a search database, associating them with respective URLs and search conditions such as a category and keywords of the Web pages concerned (S2005). And, the search center 1 periodically accesses the authorization centers $2_1$–$2_3$ to obtain registration contents of the above-mentioned respective authorization database of the authorization centers $2_1$–$2_3$, to cache the contents in a storage provided to the search center 1 itself (S2006).

Further, when the search center 1 receives a request for search of Web pages from an information browsing apparatus 4 (S2007), then, the search center 1 searches for URLs of Web pages that are registered in the search database being associated with respective search conditions that coincide with or approximate to the search condition included in the request in question. At that time, when the request in question includes a condition that authorization by a certain authorization center $2_1$–$2_3$ is obtained, then, URLs registered in the previously-cached authorization database of the authorization center in question are further searched for, among the URLs that have been detected from the above-mentioned search database, Then, the search center 1 accesses the cancelled-authorization database of the authorization center in question, to search for URLs that are not registered in the cancelled-authorization database, among the URLs detected from the previously-cached authorization database of the authorization center (S2008).

The search center 1 presents pieces of information having respective links to thus-detected URLs, to the information browsing apparatus 4 that has transmitted the search request (S2009). Using the information browsing apparatus 1, the information browsing person can select a piece of information having a link to a URL among pieces of information presented by the search center 1, so as to access and browse the Web page of the selected URL (S2010).

Now, when an authorization mark issued by an authorization center $2_1$–$2_3$ is displayed on a Web page browsed by using an information browsing apparatus 4, the information browsing person can confirm validity of the information disclosing person's act of attaching the authorization mark on the Web page (i.e., confirm if the mark is used properly/validly, and if the information disclosing person has the qualification to display the mark). Namely, when the authorization mark displayed together with the Web page is selected by the information browsing person, the information disclosing apparatus 4 accesses the authorization center $2_1$–$2_3$ linked to the authorization mark to transmits a verification request including the URL of the above-mentioned Web page (S2011). Receiving the request for verification, the authorization center $2_1$–$2_3$ in question examines if the URL included in the request is registered in the authorization database of the authorization center itself, to verify the validity of the information disclosing person's act of attaching the authorization mark onto the Web page specified by the URL (S2012). And, the result of verification is transmitted to the information browsing apparatus 4 that has transmitted the request for verification (S2013).

Figure 3:
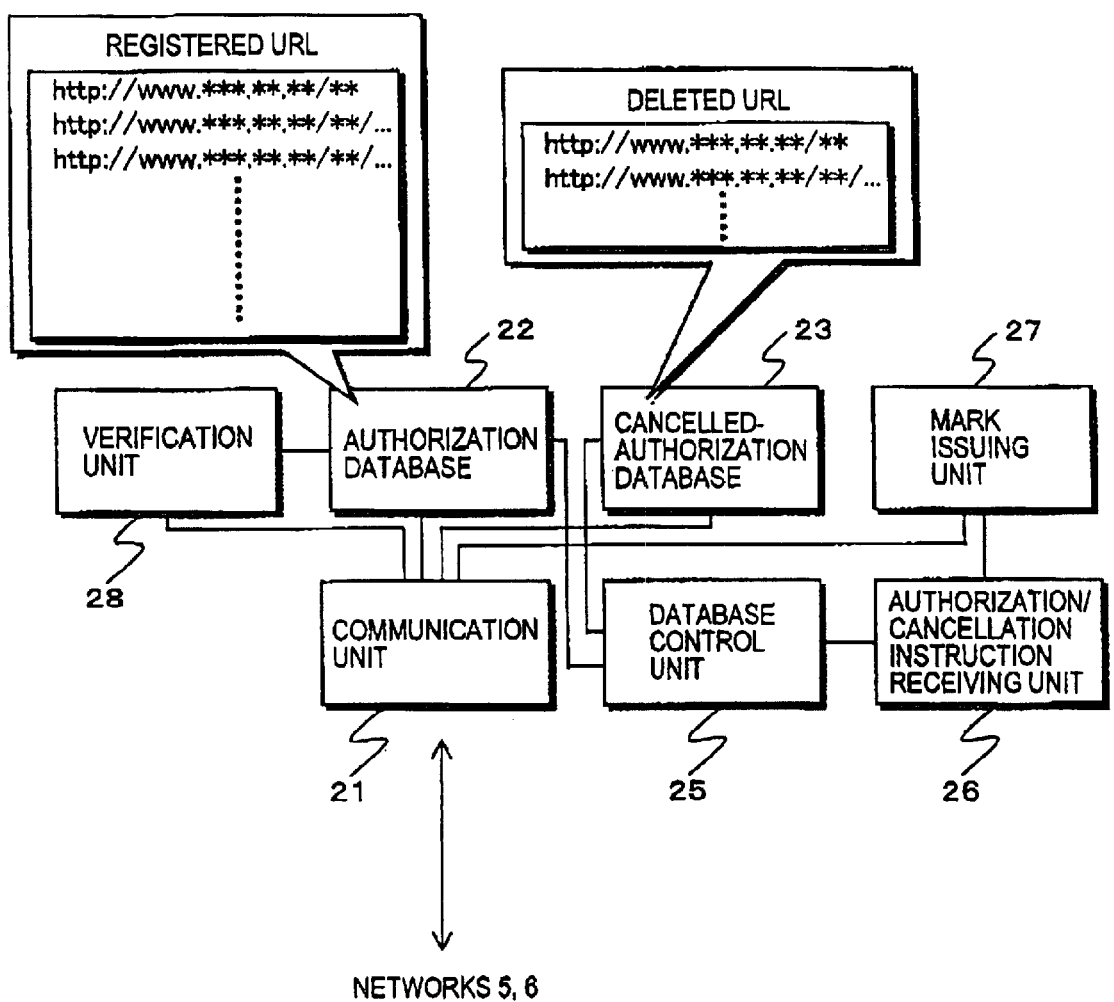
FIG. 3 is a schematic block diagram showing an authorization center $2_1$–$2_3$ shown in FIG. 1.

Next, each apparatus constituting the above-described search system will be described, An information disclosing apparatus 3 is similar to the conventional Web server, and its description will be omitted. First, an authorization center $2_1$–$2_3$ will be described FIG. 3 is a schematic block diagram showing the authorization center $2_1$–$2_3$.

As shown in the figure, each of the authorization centers $2_1$–$2_3$ comprises: a communication unit 21 for communicating with another apparatus through the networks 5 and 6; an authorization database 22 for registering URLs of Web pages opened by information disclosing persons authorized by the authorization center $2_1$–$2_3$ in question; a cancelled-authorization database 23 for registering URLs of Web pages opened by information disclosing persons whose authorization has been cancelled by the administrator of the authorization center $2_1$–$2_3$ in question; an authorization/cancellation instruction receiving unit 26 for receiving an authorization registration instruction or an authorization cancellation instruction for a URL of a Web page opened by an information disclosing person; a database control unit 25 for controlling registration/cancellation into and from the authorization database 22 and the cancelled-authorization database 23, according to an authorization registration instruction or an authorization cancellation instruction received by the authorization/cancellation instruction receiving unit 26; a mark issuing unit 27 for issuing an authorization mark (image data) indicating authorization by the administrator of the authorization center $2_1$–$2_3$ in question, according to an authorization registration instruction received by the authorization/cancellation instruction receiving unit 26; and a verification unit 28 for verifying validity of an information disclosing person's act of attaching an authorization mark on his Web page.

Next, the search center 1 will be described.

Figure 4:
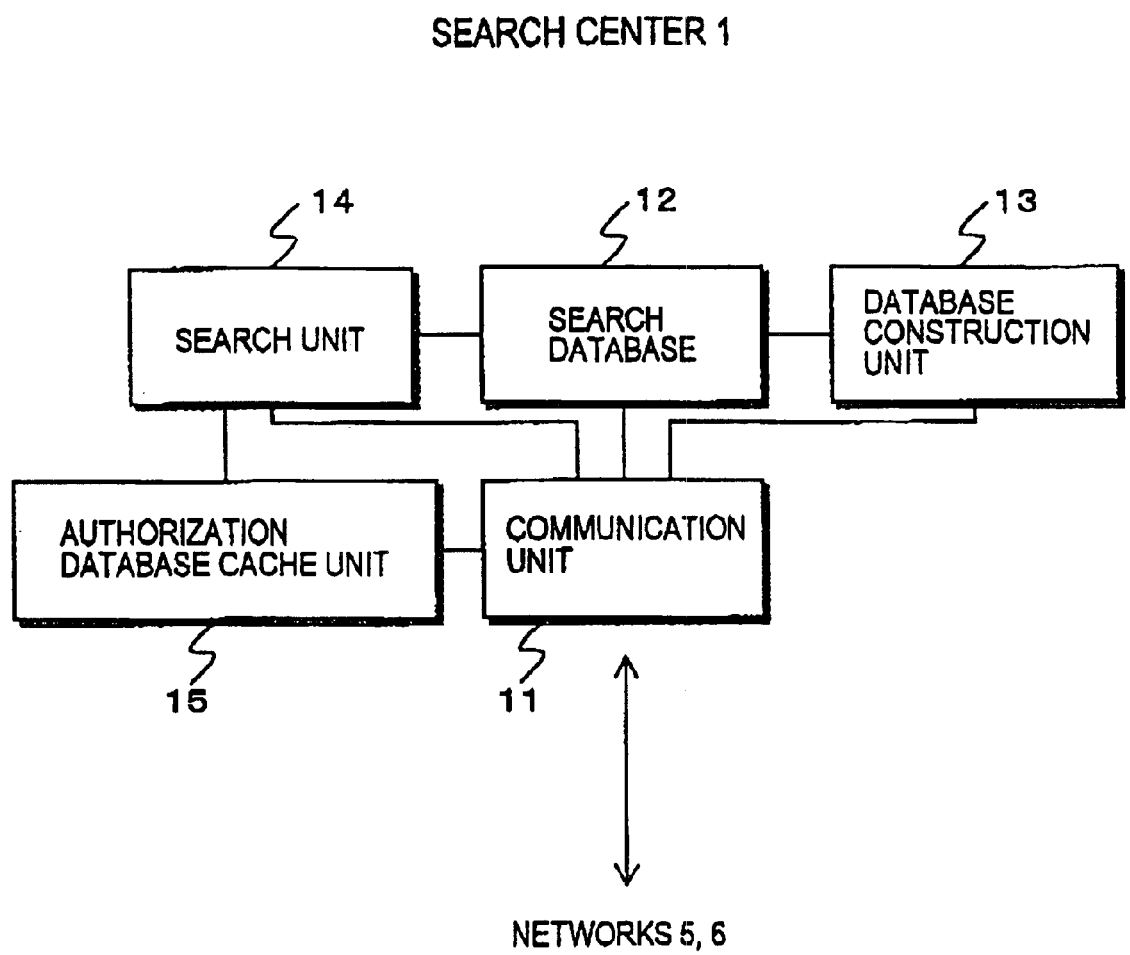
FIG. 4 is a schematic block diagram showing a search center 1 shown in FIG. 1.

FIG. 4 is a schematic block diagram showing the search center 1.

As shown in the figure, the search center 1 comprises: a communication unit 11 for communicating with another apparatus through the networks 5 and 6; the search database 12; a database construction unit 13 for constructing the search database 12; a search unit 14 for searching for link information of URLs satisfying a search request sent from an information browsing apparatus 4, and for presenting the searched link information to the information browsing apparatus 4 in question; and an authorization database cache unit 15 for obtaining and holding contents of respective authorization databases 22 of the authorization centers $2_1$–$2_3$.

FIG. 5 shows an example of registration contents of the search database 12. As shown in the figure, URLs 51 of Web pages opened by information disclosing apparatuses 3 each are registered being associated with a search condition 52 such as keywords and a category of the Web page in question, and content information 53 such as a title or the like of the Web page in question, Utilizing the conventional technique such as the above-mentioned directory-type search engine or the robot-type search engine, the database construction unit 13 collects information required for searching Web pages opened by information disclosing apparatuses 3, and registers the collected information in the search database 12.

Next, the information browsing apparatus 4 will be described.

Figure 6:
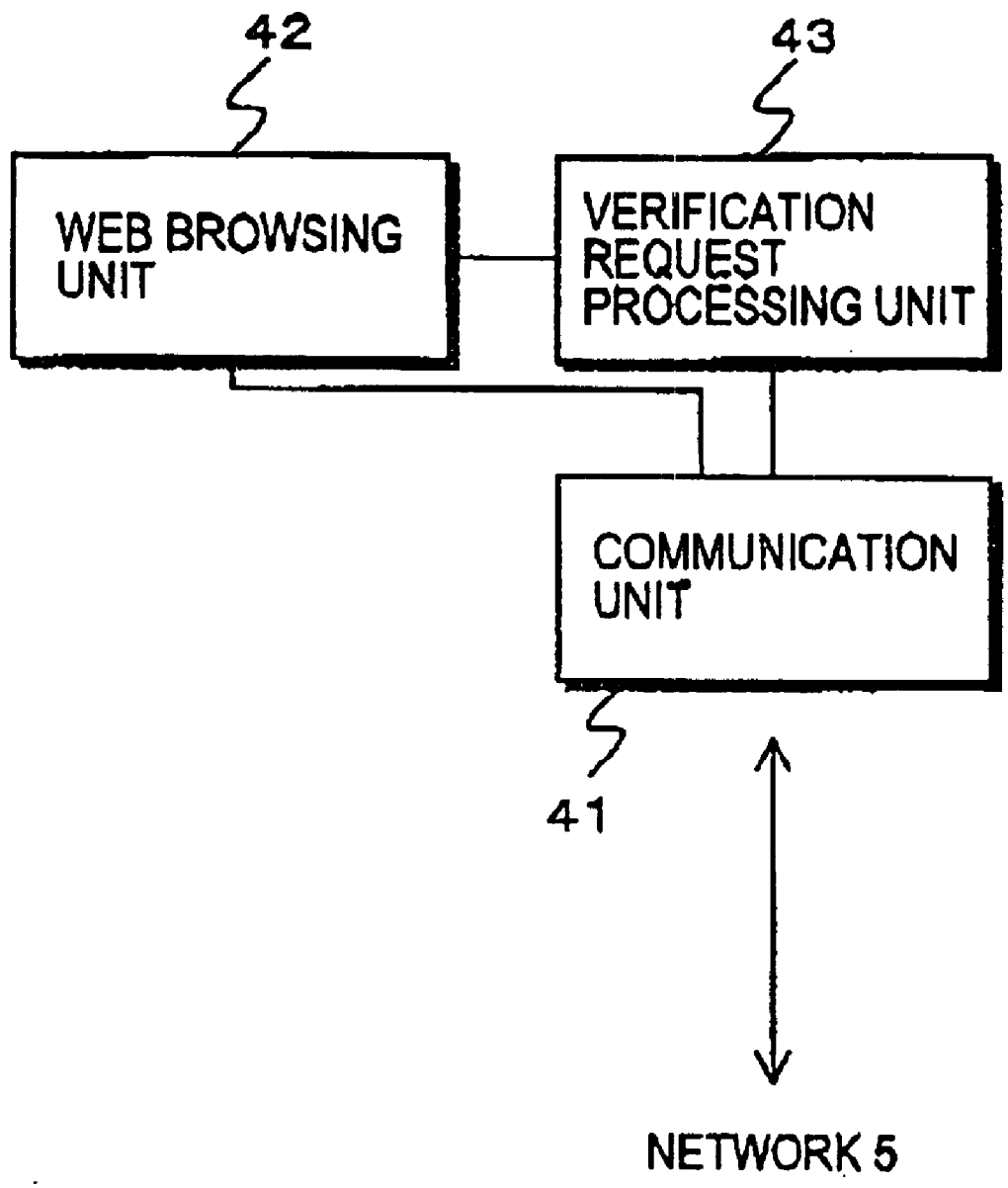
FIG. 6 is a schematic block diagram showing an information browsing apparatus 4 shown in FIG. 1.

FIG. 6 is a schematic diagram showing an information browsing apparatus 4.

As shown in the figure, the Information browsing apparatus 4 comprises: a communication unit 41 for communicating with another apparatus through the network 5; a Web browsing unit 42 for browsing Web pages opened by information browsing apparatuses 3 and the search center 1; a verification request processing unit 43 for requesting the authorization centers $2_1$–$2_3$ to verify validity of the act by an information disclosing person who has attached an authorization mark on a Web page under browsing by the Web browsing unit 42.

Figure 7:
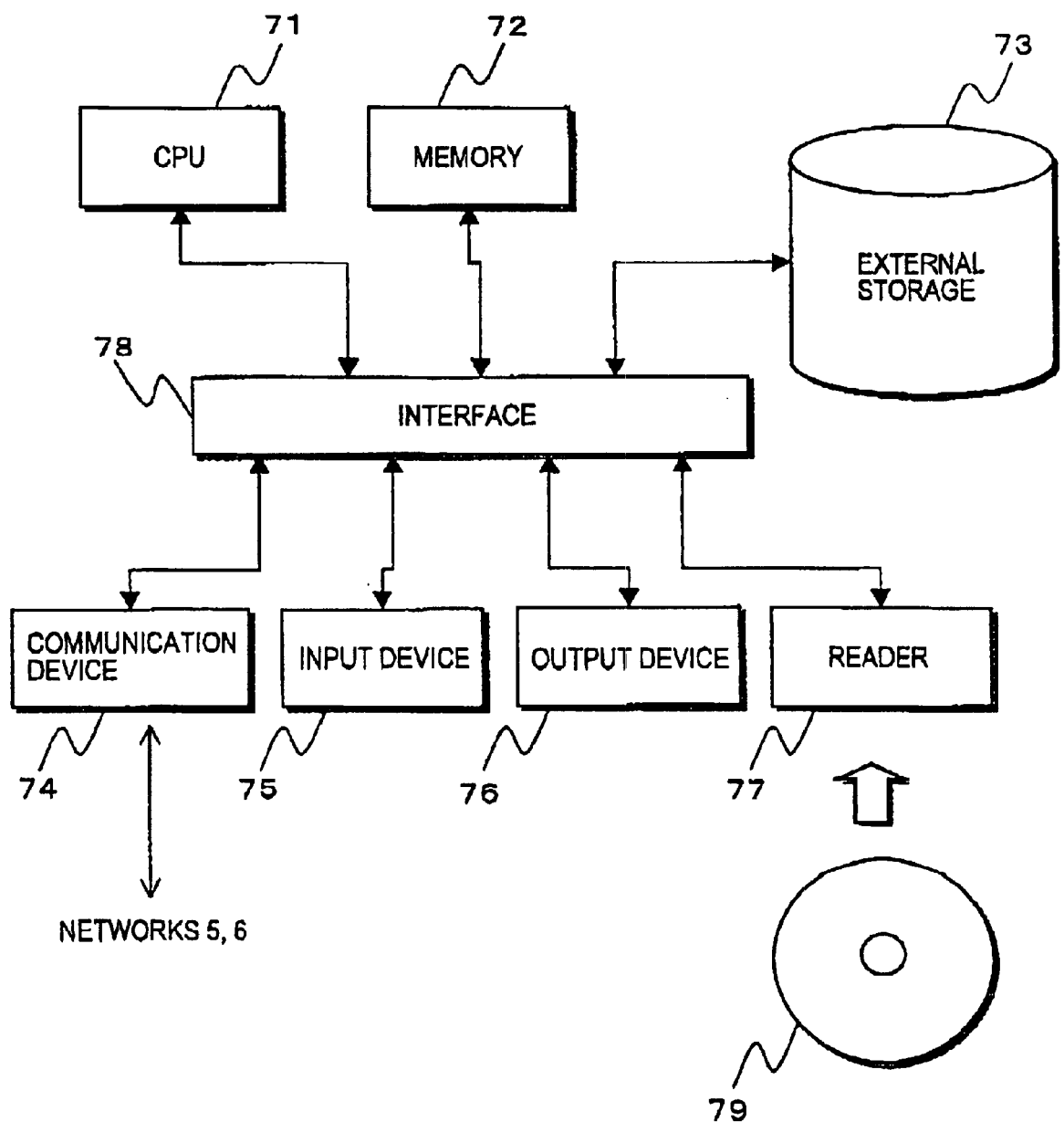
FIG. 7 is a diagram showing an example of a hardware configuration of component apparatuses constituting the search system shown in FIG. 1.

Further, each apparatus constituting the above-described search system can be implemented in an ordinary electronic computer, for example as shown in FIG. 7, comprising: a CPU 71; a memory 72; an external storage 73 such as a hard disk; a communication device 74 for communicating with another apparatus through the networks 5 and 6; an input device 75 such as a keyboard and mouse; an output device 76 such as a monitor and a printer; a reader 77 for reading data from a storage medium 79 such as a CD-ROM or PD; and an interface 78 for transmitting and receiving data between the above-mentioned component devices; when the CPU 71 executes a predetermined program loaded onto the memory 72, Such a predetermined program may be obtained from the storage medium 79 through the reader 77, or from the network 5 or 6 through the communication device 74, and loaded on the memory 72 directly or after storing the obtained program on the external storage 73 once.

Next, operation of each apparatus constituting the above-described search system will be described. Here, the operation of the information disclosing apparatus 3 is similar to the operation of the existing Web server, and its detailed description will be omitted.

First, operation of the authorization center $2_1$–$2_3$ will be described.

Figure 8:
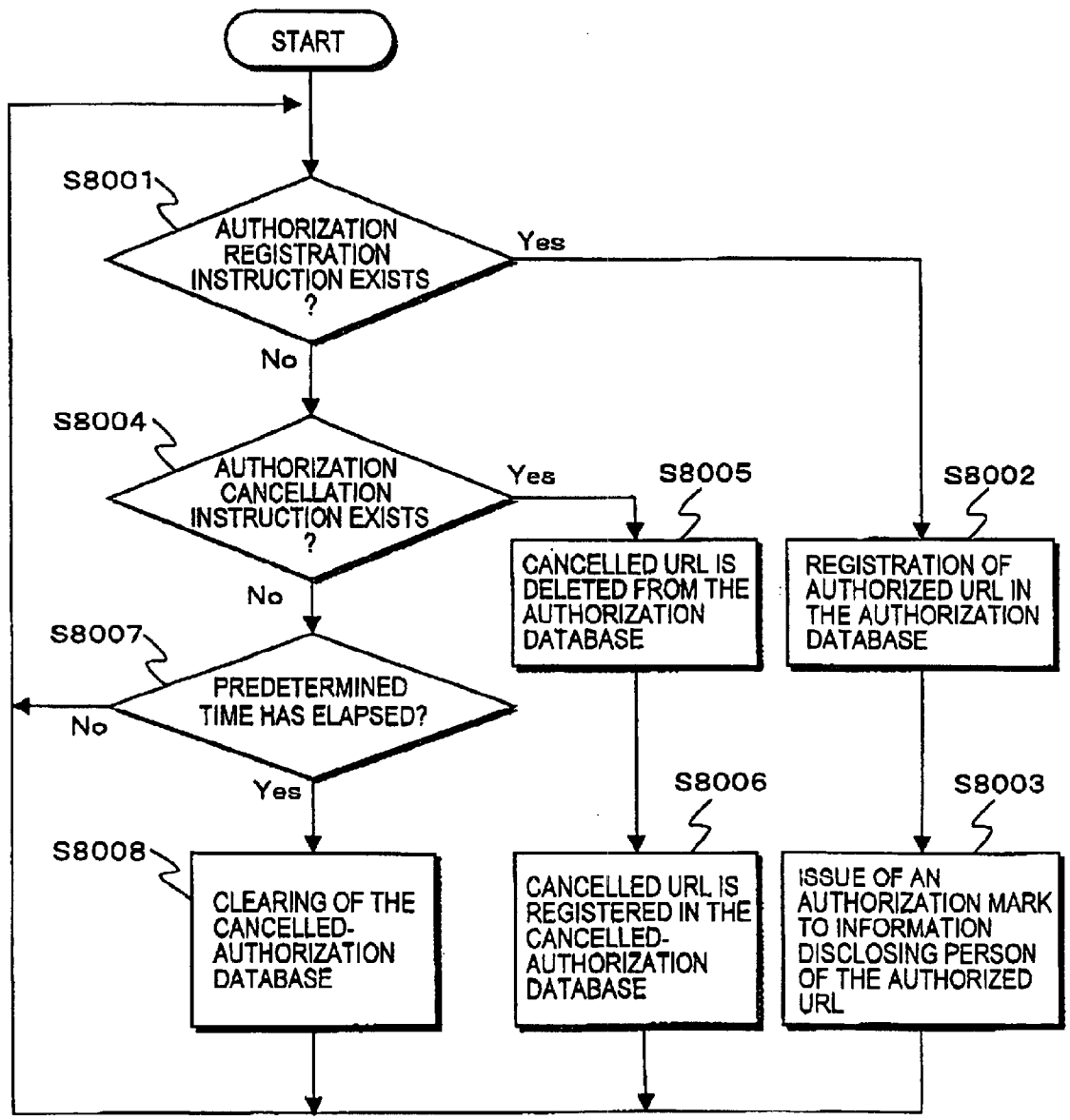
FIG. 8 is a flowchart for explaining URL authorizing/canceling operation in the authorization center 21–23 shown in FIG. 3.

FIG. 8 is a flowchart for explaining URL authorizing/canceling operation in the authorization center $2_1$–$2_3$ shown in FIG. 3.

When the authorization/cancellation instruction receiving unit 26 receives an authorization instruction (which includes designation of a URL of a Web page of an information disclosing person authorized by an administrator of an authorization center $2_1$–$2_3$) from the administrator in question (Yes in S8001), then, the authorization/cancellation instruction receiving unit 26 informs the database control unit 25 and the mark issuing unit 27 of the authorization instruction.

Being informed of this, the database control unit 25 registers the URL included in the authorization instruction received from the authorization/cancellation instruction receiving unit 26, into the authorization database 22 (S8002).

Figure 9:
FIG. 9 is a view showing an example of a Web page with an authorization mark, which is opened by an information disclosing apparatus 3 to the public.

Further, the mark issuing unit 27 issues an authorization mark (image mark) having a link to its own authorization center $2_1$–$2_3$, to the information disclosing person authorized by the administrator of the authorization center $2_1$–$2_3$ in question (S8003). Here, when the authorization instruction received from the authorization/cancellation instruction receiving unit 26 includes an address (such as a mail address) of the apparatus of the information disclosing person, then, the mark issuing unit 27 sends the issued authorization mark through the communication device 21 to the apparatus of the information disclosing person, which is specified by that address. On the other hand, when such an address is not included, then the issued authorization mark is stored into a writable storage medium such as an FD, Then, the administrator of the authorization center $2_1$–$2_3$ of the mark issuing unit 27 itself sends the storage medium to the authorized information disclosing person, by mail or the like. By this, the information disclosing person can attach the authorization mark 91, which is received from the authorization center $2_1$–$2_3$ in question and has the link to that authorization center, on his Web page 92, to open it through the information disclosing apparatus 3 to the public, as shown in FIG. 9 for example.

Further, when the authorization/cancellation instruction receiving unit 26 receives an authorization cancellation instruction, which includes designation of a URL of a Web page of an information disclosing person who has been once authorized by the administrator of the authorization center $2_1$–$2_3$, from the administrator (Yes in S8004), then, the authorization/cancellation instruction receiving unit 26 informs the database control unit 25 of the authorization cancellation instruction.

Being informed of this, the database control unit 25 deletes the URL included in the authorization cancellation instruction received from the authorization/cancellation instruction receiving unit 26, from the authorization database 22 (S8005. Further, the database control unit 25 registers the URL deleted from the authorization database 22, into the cancelled-authorization database 23 (S8006).

Here, the database control unit 25 may examine a registration date of each URL registered in the authorization database 22, to delete URLs that have elapsed the predetermined validity term from their respective registration dates, from the authorization database 22, and register the deleted URLs in the cancelled-authorization database 23.

Further, the database control unit 25 clears the registration contents of the cancelled-authorization database 23 periodically (for example, at intervals of half a day) (S8007, S8008). Thus, the cancelled-authorization database 23 describes a list of URLs that have been deleted from the authorization database within a predetermined time (for example, half a day).

Figure 10:
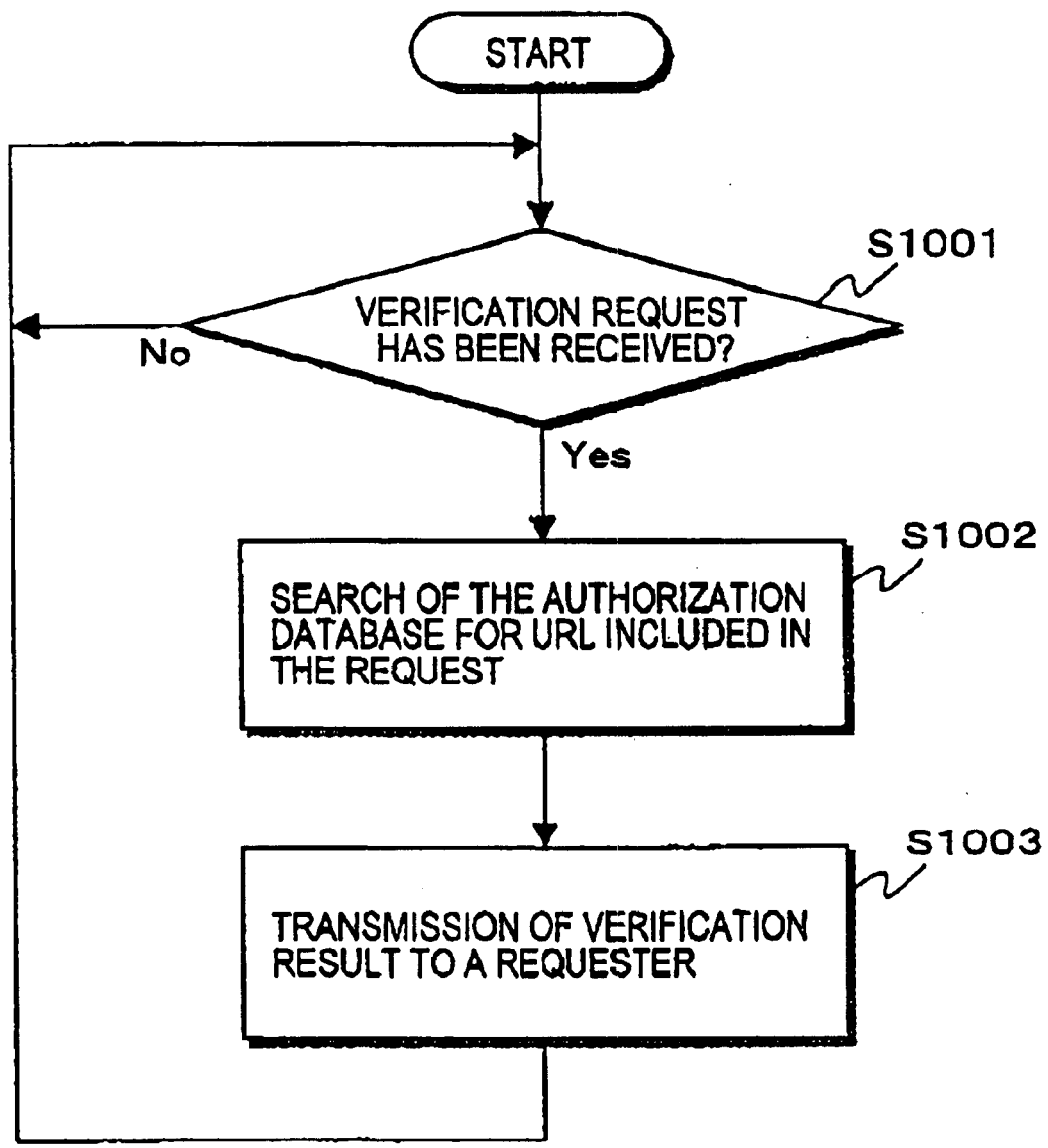
FIG. 10 is a flowchart for explaining verification operation in the authorization center $2_1$–$2_3$ shown in FIG. 3.

FIG. 10 is a flowchart for explaining verification operation in the authorization center $2_1$–$2_3$ shown in FIG. 3.

When the verification unit 28 receives a verification request, which includes a URL, from an information browsing apparatus 4 (Yes in S1001), the verification unit 28 examines if the URL in question is registered in the authorization database (S1002). And, the verification unit 28 transmits the result, as a verification result, to the information browsing apparatus 4 that has transmitted the above-mentioned verification request (S1003).

Next, operation of the information browsing apparatus 4 will be described.

Figure 11:
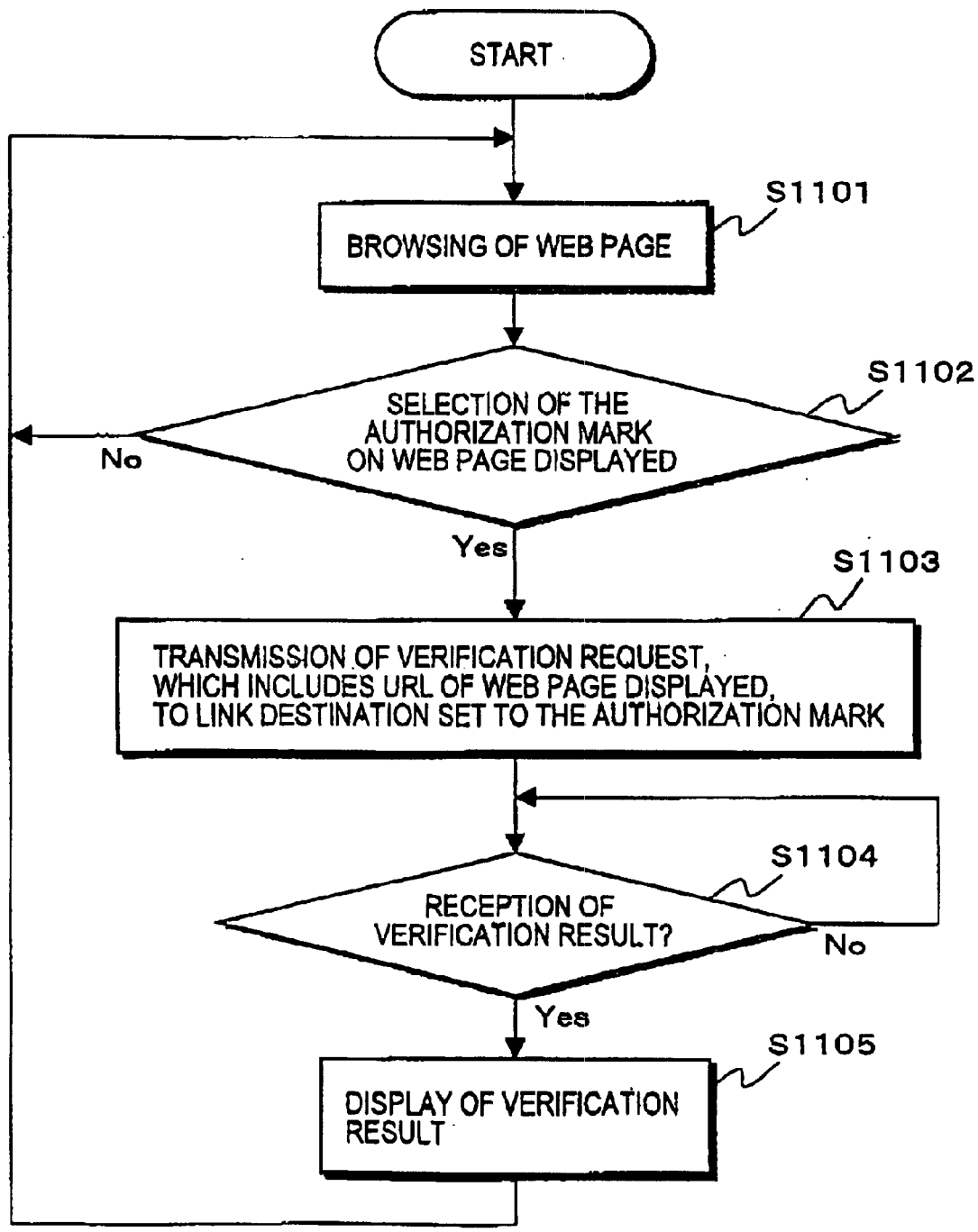
FIG. 11 is a flowchart for explaining operation of the information browsing apparatus 4 shown in FIG. 6.

FIG. 11 is a flowchart for explaining operation of the information browsing apparatus 4 shown in FIG. 6.

The Web browsing unit 42 accesses information disclosing apparatuses 3 and the search center 1, according to an instruction of an information browsing person, to browse the Web pages opened by those apparatuses to the public. Further, the Web browsing unit 42 receives input of a search condition from an information browsing person, in a Web page opened by the search center 1 for searching Web pages, and transmits a search request, which includes the received search condition, to the search center 1. Then, the Web browsing unit 42 receives a search result from the search center 1, and displays the result (S1101).

Figure 12:
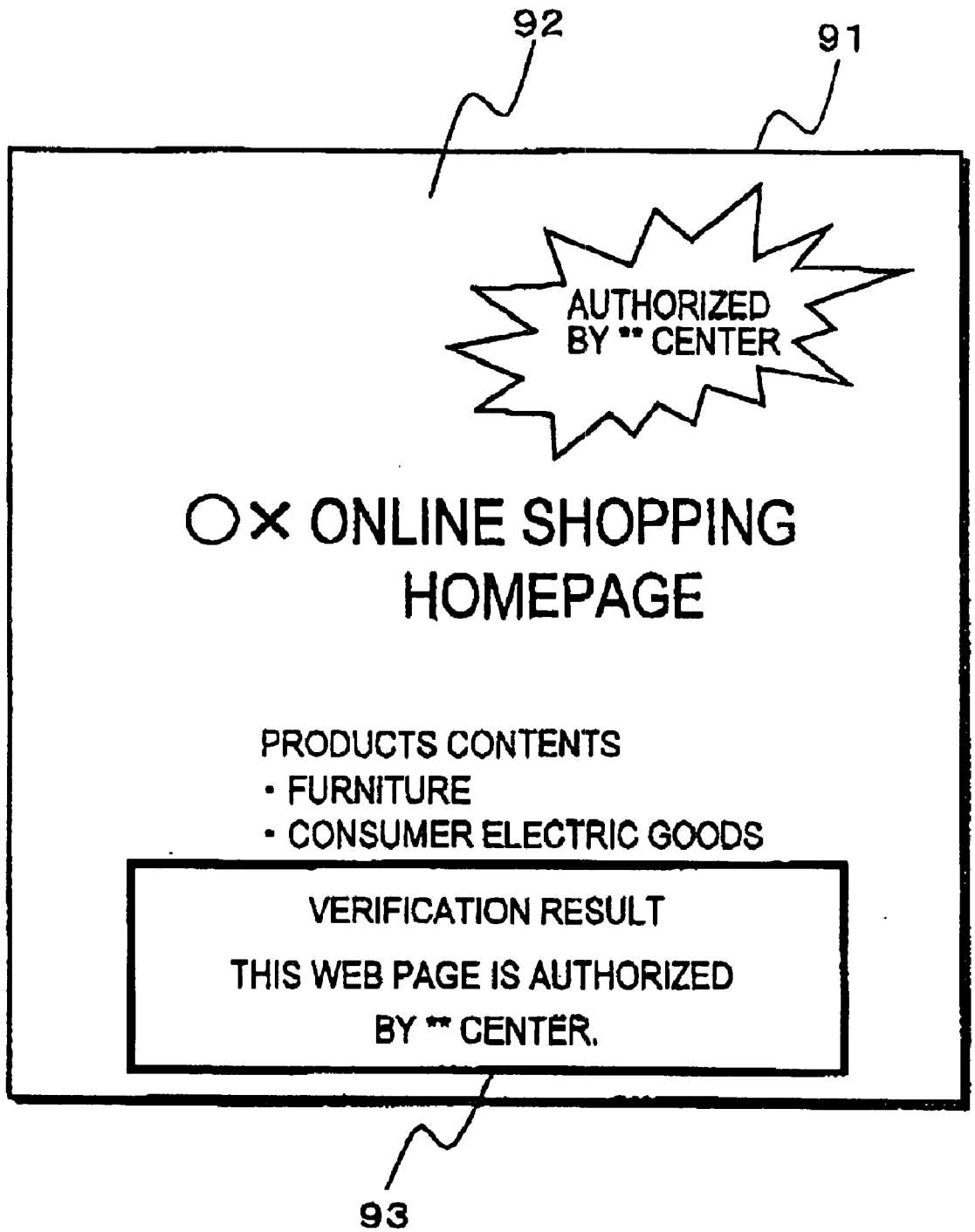
FIG. 12 is a view showing a display example of a result of verification of the authorization mark displayed on the information browsing apparatus 4.

Now, in a state that the Web browsing unit 42 displays a Web page 92 as shown in FIG, 9 for example, when the verification request processing unit 43 knows that the information browsing person selects the authorization mark 91 displayed together with the Web page 92 in question, using the input device such as a mouse (S1102), then, the verification request processing unit 43 transmits a verification request, which includes the URL of the Web page 92 under display, to the authorization center $2_1$–$2_3$ linked to the authorization mark 91 in question (S1103). Then, receiving a verification result from the authorization center $2_1$–$2_3$ in question (S1104), the verification request processing unit 43 displays the contents 93 of the verification result on the Web page 92 under display, as shown in FIG. 12. Or, the contents 93 may be displayed in another window, or may be displayed in place of the Web page 92 displayed now (S1105).

Next, operation of the search center 1 will be described.

Figure 13:
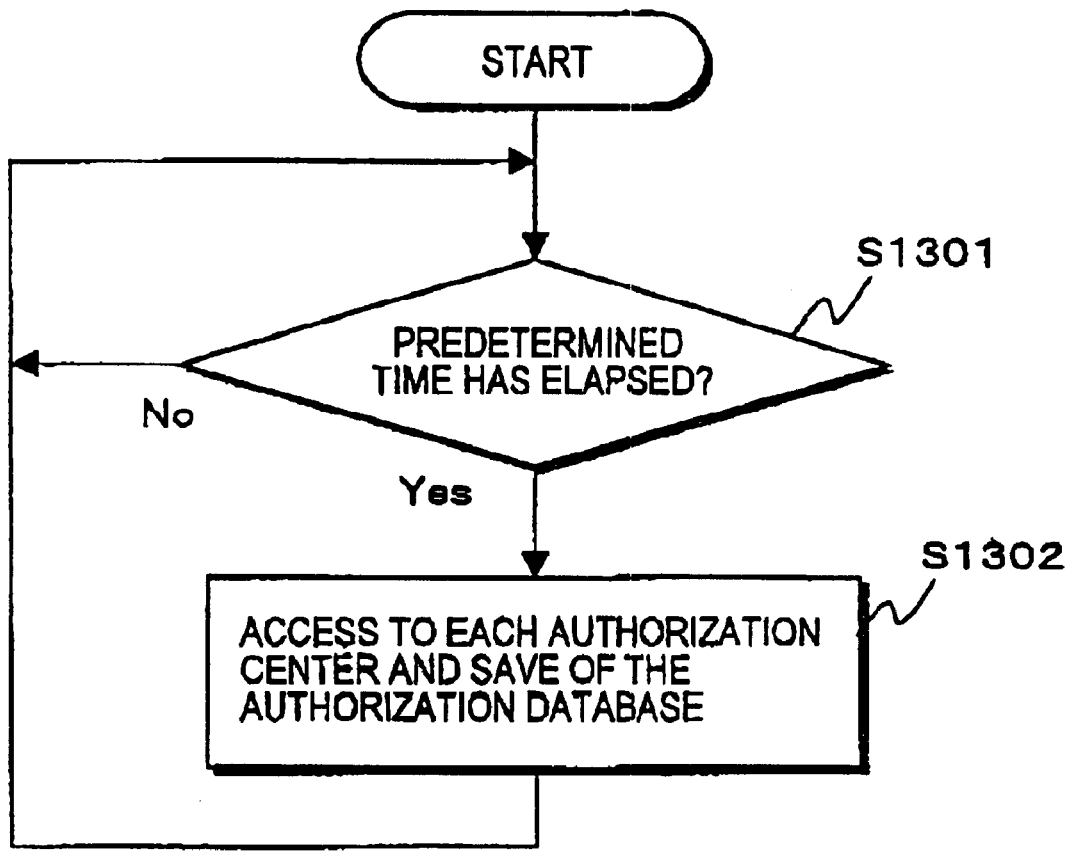
FIG. 13 is a flowchart for explaining operation of a search center 1 shown in FIG. 4 for caching the contents of an authorization database 22 of each authorization center $2_1$–$2_3$.

FIG. 13 is a flowchart for explaining operation of the search center 1 shown in FIG. 4 for caching contents of the authorization database 22 of each authorization center $2_1$–$2_3$.

The authorization database cache unit 15 periodically accesses respective authorization databases 22 of the authorization centers $2_1$–$2_3$, and stores the registration contents, associating them with the respective authorization centers accessed (S1301 and S1302). Here, each interval between accesses to the respective authorization database 22 of the authorization centers $2_1$–$2_3$ is set shorter than each interval (for example, half a day) at which the database control unit 25 of each authorization center $2_1$–$2_3$ clears the contents of the cancelled-authorization database 23. Owing to this arrangement, the search center 1 can specify the newest contents registered in the authorization database 22 of an authorization center $2_1$–$2_3$, by referring to the contents of the authorization database 22 of the authorization center in question, which is held by the authorization database cache unit 15, and by referring to the newest contents stored in the cancelled-authorization database 23 of the authorization center in question.

Figure 14:
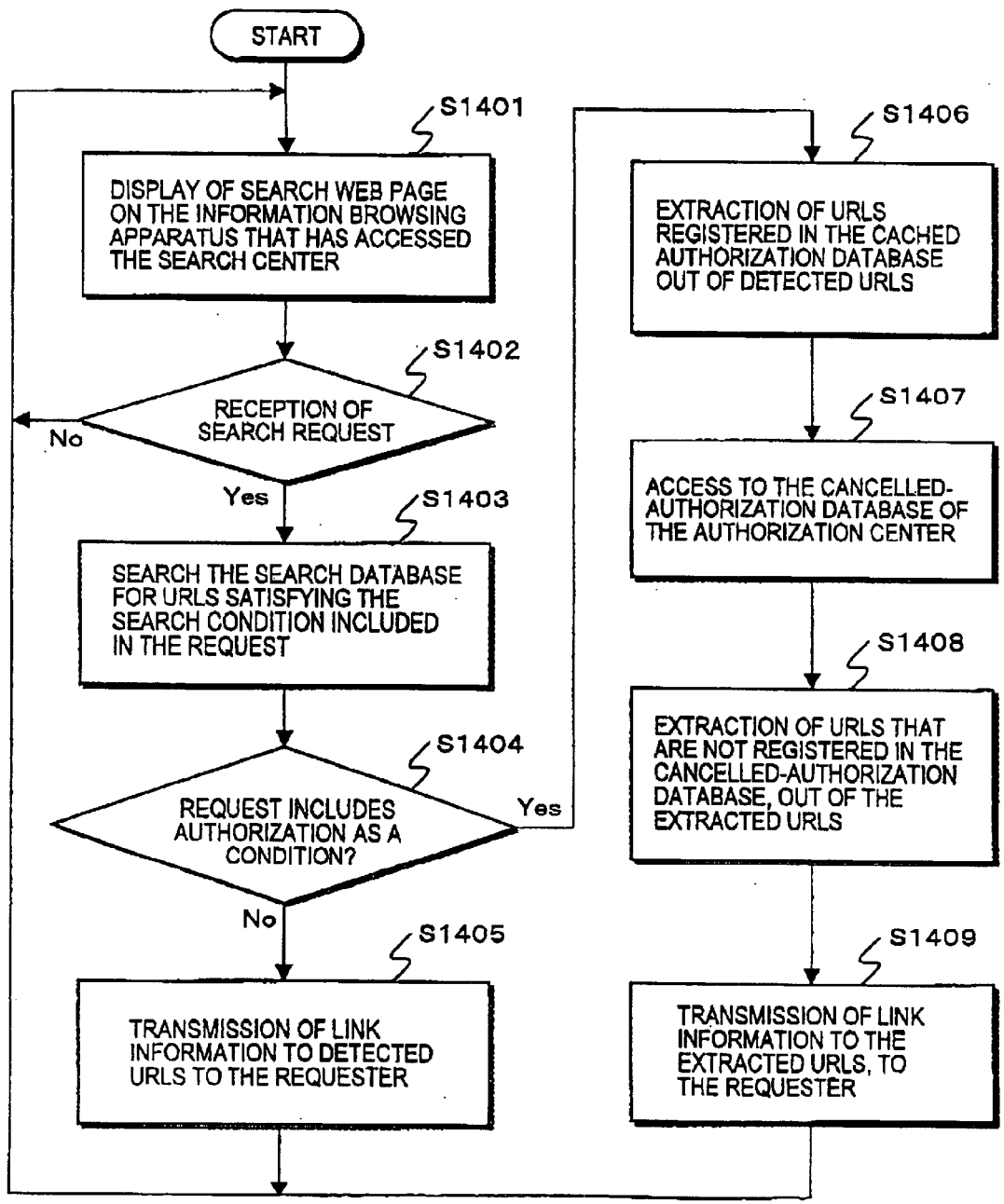
FIG. 14 is a flowchart for explaining operation of the search center 1 shown in FIG. 4 for searching for each authorization center $2_1$–$2_3$.

FIG. 14 is a flowchart for explaining operation of the search center 1 shown in FIG. 4 for searching for each authorization center $2_1$–$2_3$.

Figure 15:
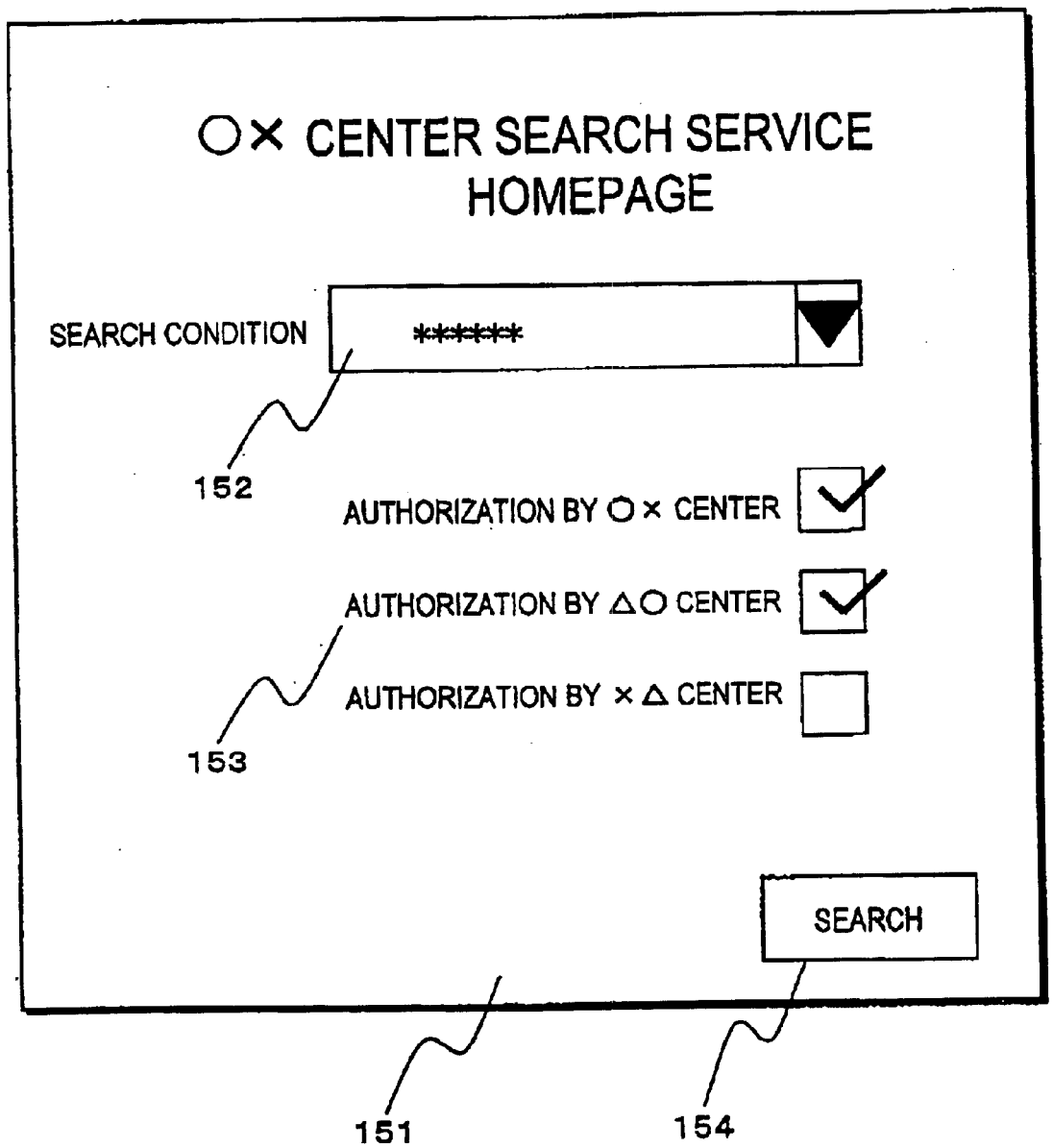
FIG. 15 is a view showing an example of a search Web page displayed by the search center 1 on the information browsing apparatus 4 that has accessed the search center 1.

The search unit 14 displays a search Web page 151, for example, as shown in FIG. 15, on an information browsing apparatus 4 that accesses the search center 1 (S1401). In the example shown in FIG. 15, the search Web page 151 is provided with an entry 152 for inputting a search condition and entries 153 each for checking when authorization by the authorization center $2_1$–$2_3$ concerned is to be included as a condition. When the information browsing person inputs a search condition such as keywords or a category into the entry 152 of the search Web page 151 displayed on the information browsing apparatus 4, checks an entry (or entries) corresponding to authorization by an authorization center (or, centers) $2_1$–$2_3$, which he desires to add to the conditions, and selects a search button 154, then, the information browsing apparatus 4 generates a search request that includes the inputted search condition and the designation of authorization by the checked authorization center (or, centers) $2_1$–$2_3$, and transmits the search request to the search center 1. Here, a plurality of authorization centers $2_1$–$2_3$ can be selected by checking the corresponding entries 153. Such a search Web page 151 can be generated by utilizing CGI (Common Gateway Interface), for example. Further, when a category is used as a search condition, the entry 152 may be provided in the so-called pull-down menu form, such that an information browsing person selects among predetermined categories.

Now, when the search unit 14 receives the search request from the information browsing apparatus 4 that has displayed the search Web page 151 (S1402), then, the search unit 14 extracts URLs 51 and respective pieces of content information 53 associated with search conditions that coincide with or approximate to the search condition included in the search request in question, from the search database 12, in a manner similar to the conventional search engines (S1403). When the search request in question does not include a condition that authorization is given by an authorization center $2_1$–$2_3$ (No in S1404), then, the search unit 14 provides each piece of extracted content information 53 with a link to the corresponding URL 51, and displays a list of the extracted pieces of content information 53 having such links, on the information browsing apparatus 4 that has transmitted the search request In question (S1405). By this, the information browsing person can select a desired piece of content information 53 from the list of content information 53 displayed on the information browsing apparatus 4, to browse the Web page of the URL 51 linked to the selected piece of content information 53.

On the other hand, when the search request in question includes a condition of authorization by an authorization center $2_1$–$2_3$ (Yes in S1404), the search unit 14 examines the authorization database 22 of the authorization center $2_1$–$2_3$ whose authorization is included in the condition, to extract only pairs of a URL 51 and content information 53 of which URL 51 is registered in the authorization database 22, out of the pairs of a URL 51 and content information 53 extracted in S1403 (S1406). Here, the authorization database 22 that has been cached in advance in the authorization database cache unit 15 is examined.

Further, the search unit 14 accesses the cancelled-authorization database 23 of the authorization center $2_1$–$2_3$ whose authorization is included in the condition, through the communication unit 11, to obtain the contents of the database (S1407). Then, the search unit 14 extracts only pairs whose URLs 51 are not registered in the cancelled-authorization database 23 in question, out of the pairs of a URL 51 and content information 53 extracted in S1406 (S1408).

When the pairs of a URL 51 and content information 53 are extracted as described above, the search unit 14 provides each piece of extracted content information 53 with a link to the corresponding URL 51, and displays a list of the extracted pieces of content information 53 having such links, on the information browsing apparatus 4 that has transmitted the search request in question (S1409). By this, the information browsing person can select a desired piece of content information 53 from the list of content information 53 displayed on the information browsing apparatus 4, to browse the Web page of the URL 51 linked to the selected piece of content information 53.

Hereinabove, one embodiment of the present invention has been described.

In the present embodiment, an information browsing person sends the search center 1 a search request that includes not only a search condition such as keywords or a category but also a condition that authorization is given by a desired authorization center (or, centers) $2_1$–$2_3$. Thereby,. it is possible that only Web pages for which reliability of respective information disclosing persons is assured to some degree are introduced to the information browsing person. Further, the authorization centers $2_1$–$2_3$, which are independent of the search center 1, examine reliability of an information disclosing person and register a URL of a Web page opened by an information disclosing person whose reliability is assured. Thereby, the search center does not need to examine, for example, reliability of an information disclosing person, when a URL of a Web page opened by the information disclosing person is registered in the search database 12.

Accordingly, an existing search engine such as a directory-type search engine or a robot-type search engine can be used as it is, for registering URLs of Web pages in the search database 12. Thus, the present embodiment can efficiently provide a search service that also takes security into consideration.

Further, the present embodiment provides the authorization centers $2_1$–$2_3$ for respective kinds of security: namely, the authorization center A $2_1$ for authorizing security against leakage of personal information, the authorization center B $2_2$ for authorizing validity of contents provided by an information disclosing person, and the authorization center C $2_3$ for security in electronic commerce. Security, or reliability required for an information disclosing person, varies depending on purposes of electronic data opened to the public by that information disclosing person. For example, when the purpose is to provide news or information on the information disclosing person himself, then, it is sufficient to assure information browsing persons of security against leakage of personal information. However, when the purpose is to distribute contents such as music data or image data, then, it is also desired to assure information browsing persons of validity of the contents themselves (i.e., to assure that the contents are not illegal copies). Further, when the purpose is to perform electronic commerce accompanied by money transfer with the information disclosing person, then, it is also desired to assure information browsing persons of security in settlement. Thus, reliability required for an information disclosing person is various, and accordingly, authorization conditions in examination by an authorization center also differ depending on degrees of the reliability required for the information disclosing person. From this point of view, in the present embodiment, the authorization centers $2_1$–$2_3$ are provided for respective kinds of security. An information disclosing person can select an authorization center(s) $2_1$–$2_3$ of which he requests registration into the authorization database 22, depending on the purpose of his own Web page opened to the public. In addition, an information browsing person sends the search center 1 a search request that makes it a condition that authorization is given by an authorization center (or, centers) $2_1$–$2_3$ corresponding to the purpose of the Web pages that he wants to know. As a result, a search service, which also takes security into consideration, can be provided efficiently.

Further, in the present embodiment, the search center 1 periodically accesses the respective authorization databases 22 of the authorization centers $2_1$–$2_3$ through the authorization database cache unit 15, to hold their registration contents in the storage device or the like provided to the search center 1 itself. And, when a search request received from an information browsing apparatus 4 includes a condition that authorization is given by a certain authorization center $2_1$–$2_3$, in addition to a search condition, then, the search unit 14 extracts URLs of Web pages that are registered in the search database 12 being associated with the above-mentioned search condition, and, registered in the authorization database 22 of the authorization center $2_1$–$2_3$ in question. That authorization database 22 is held in the storage device or the like by the authorization database cache unit 15. Then, the search unit 14 accesses the authorization center $2_1$–$2_3$ in question, examines the registration contents of the cancelled-authorization database 23 of the authorization center $2_1$–$2_3$ in question, and extracts URLs that are not registered in the cancelled-authorization database 23 in question, out of the above-mentioned extracted URLs of the Web pages, to present the information browsing apparatus 4 with information having links to those URLs.

Here, a list of URLs registered in the cancelled-authorization database 23 is a list of URLs whose authorization has been cancelled within a predetermined period. That list includes far much smaller number of URLs than the list of URLs registered in an authorization database 22. Thus, according to the arrangement of the present embodiment, it is possible to shorten the time taken between reception of a search request and detection of URLs that satisfy the search request, in comparison with the case in which the authorization center $2_1$–$2_3$ in question is accessed after reception of a search request, in order to examine the registration contents of the authorization database 22 of the authorization center $2_1$–$2_3$ in question. In other words, search can be performed at higher speed.

The present invention is not limited to the above-described embodiment, and can be variously modified within the gist of the invention.

For example, in the above-described embodiment, the authorization database cache unit 15 of the search center 1 periodically accesses respective authorization database 22 of the authorization centers $2_1$–$2_3$, to hold their registration contents in the storage device or the like provided to the search center I itself. However, the present invention is not limited to this. In the case where the authorization center $2_1$–$2_3$ concerned is accessed after reception of a search request, in order to examine the registration contents of the authorization database 22 of the authorization center $2_1$–$2_3$ in question, it is not required to provide the authorization database cache unit 15. In that case, it is not necessary to provide the respective cancelled-authorization database 23 to the authorization centers $2_1$–$2_3$.

Further, in the above-described embodiment, validity of an information disclosing person's act of attaching an authorization mark on his Web page is confirmed in the following manner, Namely, the mark issuing unit 27 of the authorization center $2_1$–$2_3$ concerned issues an authorization mark, while providing the mark with a link to the authorization center $2_1$–$2_3$ as the issuer. And, caused by an information browsing person's act of selecting the authorization mark displayed together with the Web page, the verification unit 28 of the authorization center $2_1$–$2_3$ in question examines if the URL of the Web page, which is included in a verification request sent from the information browsing apparatus, is registered in the authorization database 22, and transmits the result to the information browsing apparatus 4 that has transmitted the verification request.

However, the present invention is not limited to this. Validity of an information disclosing person's act of attaching an authorization mark on a Web page may be confirmed, for example, as follows. Namely, the mark issuing unit 27 of an authorization center $2_1$–$2_3$ generates an electronic signature to a Web page (or, a URL of the Web page, or relevant information such as a producer of the Web page) of an information disclosing person to whom the authorization mark is issued. Then, the mark issuing unit 27 embeds the signature in the authorization mark, utilizing an electronic watermark technique or the like. Thus-generated authorization mark is issued to the information disclosing person. Further, as shown in FIG. 16, the information browsing apparatus 4 is provided with a verification unit 44 instead of the verification request processing unit 43. The verification unit 44 detects an information browsing person's act of selecting the authorization mark displayed together with the Web page by the Web browsing unit 42. When the act is detected, the verification unit 44 extracts the electronic signature embedded in the authorization mark, to verify the signature. According to this arrangement, the information disclosing apparatus 4 can verify validity of the information disclosing person's act of attaching the authorization mark on the Web page, without requesting an authorization center $2_1$–$2_3$ to do that (namely, verification is performed offline). In that case, the respective verification units 28 of the authorization centers $2_1$–$2_3$ are useless.

Further, in the above-described embodiment, each authorization center $2_1$–$2_3$ examines if an information disclosing person satisfies the conditions required for authorization, registers a URL of a Web page opened by the information disclosing person, in the authorization database 22, and issues an authorization mark to the authorized information disclosing person. However, the mentioned processing may be performed in different centers (agencies). Or, each authorization center $2_1$–$2_3$ may perform only examination, and a third-party center may generally perform issuing of an authorization mark to an information disclosing person authorized by an authorization center $2_1$–$2_3$, and registration of a URL of a Web page opened by the information disclosing person, in the authorization database 22.

Further, in the above-described embodiment, the search center 1 displays, on an information disclosing apparatus 4, a list of pieces of information (content information) having respective links to URLs of Web pages that satisfy a search condition designated by an operator of the information disclosing apparatus 4. However, this invention is not limited to this. The search center 1 may display, on an information disclosing apparatus 4, a list of URLs that satisfy conditions designated by an operator of the information disclosing apparatus 4.

Further, in the above-described embodiment, the search system for searching URLs of Web pages is taken as an example. However, the present invention can be widely applied to search systems that search for addresses of electronic data.

As described above, the present invention can efficiently provide a search service that also takes security into consideration.

What is claimed is:

1. A electronic data search system for presenting an information browsing person with information having links to electronic data satisfying a search condition received from said information browsing person comprising:

a search center; and at least one authorization center, wherein said search center comprises:

a search database in which an address of electronic data opened to the public by an information disclosing person is registered, being associated with a search condition of said electronic data, search request receiving means for receiving a search request, which includes a search condition, from a terminal of an information browsing person, and search means for searching for an address of electronic data that is registered in said search database being associated with a search condition included in a search request received by said search request receiving means from a terminal of an information browsing person, and for presenting the terminal of said information browsing person with information having a link to the electronic data of the detected address, wherein said at least one authorization center comprises:

an authorization registration means for registering an address of electronic data opened to the public by an information disclosing person who satisfies predetermined authorization conditions, in an authorization database, wherein, when a search request, which is received by said search request receiving means from a terminal of an information browsing person, includes not only a search condition but also a condition that authorization by a certain authorization center is given, then said search means searches for addresses of electronic data that are registered in said search database being associated with said search condition, and registered in the authorization database of said authorization center, wherein said search means presents information having links to the electronic data at the detected addresses, to the terminal of said information browsing person, wherein said authorization center further comprises:

cancelled-authorization registration means for registering an address of electronic data deleted from said authorization database in a cancelled-authorization database, wherein said search center further comprises:

cache means that periodically accesses said authorization database of each authorization center, obtains contents of said authorization database of each authorization center, and holds the obtained contents in a storage device provided to the cache means, and wherein when a search request received by said search request receiving means from a terminal of an information browsing person includes not only a search condition but also a condition that authorization by a certain authorization center is given, then said search means searches for addresses of electronic data that are registered in said search database being associated with said search condition, and registered in said authorization center's authorization database held in said storage device by said cache means, and not registered in the cancelled-authorization database of said authorization center, and then said search means presents information having links to the electronic data at the detected addresses to the terminal of said information browsing person.

2. A electronic data search system for presenting an information browsing person with information having links to electronic data satisfying a search condition received from said information browsing person, comprising:

a search center; and at least one authorization center, wherein said search center comprises:

a search database in which an address of electronic data opened to the public by an information disclosing person is registered being associated with a search condition of said electronic data, search request receiving means for receiving a search request, which includes a search condition, from a terminal of an information browsing person, and search means for searching for an address of electronic data that is registered in said search database being associated with a search condition included in a search request received by said search request receiving means from a terminal of an information browsing person, and for presenting the terminal of said information browsing person with information having a link to the electronic data of the detected address, wherein said at least one authorization center comprises:

an authorization registration means for registering an address of electronic data opened to the public by an information disclosing person who satisfies predetermined authorization conditions, in an authorization database, wherein, when a search request, which is received by said search request receiving means from a terminal of an information browsing person, includes not only a search condition but also a condition that authorization by a certain authorization center is given, then said search means searches for addresses of electronic data that are registered in said search database being associated with said search condition, and registered in the authorization database of said authorization center, wherein said search means presents information having links to the electronic data at the detected addresses, to the terminal of said information browsing person, wherein said authorization center further comprises:

mark issuing means for issuing an authorization mark having a link to said authorization center to an information disclosing person who opens electronic data of which an address is registered in said authorization database through said authorization registration means, and for permitting display of said authorization mark on said electronic data, verification request receiving means for receiving a verification request that includes an address of electronic data from a terminal of an information browsing person, and verification means for verifying that an address of electronic data, which is included in a verification request received by said verification request receiving means from a terminal of an information browsing person, is registered in said authorization database, and for presenting a result of verification to the terminal of said information browsing person, and wherein in response to an information browsing person's operation of selecting an authorization mark displayed together with browsed electronic data, a terminal of said information browsing person transmits an authorization request that includes an address of said electronic data to an authorization center linked to said authorization mark.

3. A electronic data search system for presenting an information browsing person with information having links to electronic data satisfying a search condition received from said information browsing person, comprising:

a search center; and at least one authorization center, wherein said search center comprises:

a search database in which an address of electronic data opened to the public by an information disclosing person is registered, being associated with a search condition of said electronic data, search request receiving means for receiving a search request, which includes a search condition, from a terminal of an information browsing person, and search means for searching for an address of electronic data that is registered in said search database being associated with a search condition included in a search request received by said search request receiving means from a terminal of an information browsing person, and for presenting the terminal of said information browsing person with information having a link to the electronic data of the detected address, wherein said at least one authorization center comprises:

an authorization registration means for registering an address of electronic data opened to the public by an information disclosing person who satisfies predetermined authorization conditions, in an authorization database, wherein, when a search request, which is received by said search request receiving means from a terminal of an information browsing person, includes not only a search condition but also a condition that authorization by a certain authorization center is given, then said search means searches for addresses of electronic data that are registered in said search database being associated with said search condition, and registered in the authorization database of said authorization center, wherein said search means presents information having links to the electronic data at the detected addresses, to the terminal of said information browsing person, wherein said authorization center further comprises:

mark issuing means for issuing to an information disclosing person, who opens electronic data of which an address is registered in said authorization database by said authorization registration means, an authorization mark embedded with an electronic watermark of signature information for said electronic data or for information relevant to said electronic data, and for permitting display of said authorization mark on said electronic data, and wherein in response to an information browsing person's operation of selecting an authorization mark displayed together with browsed electronic data, a terminal of said information browsing person extracts signature information embedded as electronic watermark information in said authorization mark and uses the extracted signature information to verify said electronic data.

* * * * *